(12) United States Patent
Kim et al.

(10) Patent No.: US 10,469,742 B2
(45) Date of Patent: Nov. 5, 2019

(54) APPARATUS AND METHOD FOR PROCESSING IMAGE

(71) Applicant: SAMSUNG ELECTRONICS CO., LTD., Suwon-si, Gyeonggi-do (KR)

(72) Inventors: Sung-Oh Kim, Suwon-si (KR); Kwang-Tai Kim, Suwon-si (KR); Soo-Hyung Kim, Hwaseong-si (KR); Hyun-Hee Park, Seoul (KR); Dong-Hyun Yeom, Bucheon-si (KR); Ki-Huk Lee, Suwon-si (KR); Yong-Man Lee, Seongnam-si (KR); Jee-Hoon An, Seoul (KR); Seul-Ki Jang, Suwon-si (KR); Hyung-Ju Chun, Hwaseong-si (KR); Jong-Bum Choi, Yongin-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 15/634,078

(22) Filed: Jun. 27, 2017

(65) Prior Publication Data

US 2017/0374281 A1 Dec. 28, 2017

(30) Foreign Application Priority Data

Jun. 27, 2016 (KR) ........................ 10-2016-0080143

(51) Int. Cl.
*H04N 5/232* (2006.01)
*H04N 5/225* (2006.01)
(Continued)

(52) U.S. Cl.
CPC ....... *H04N 5/23232* (2013.01); *H04N 5/2258* (2013.01); *H04N 5/2351* (2013.01);
(Continued)

(58) Field of Classification Search
CPC .. H04N 5/23232; H04N 5/145; H04N 5/2355; H04N 5/2351; H04N 5/2258;
(Continued)

(56) References Cited

U.S. PATENT DOCUMENTS 6,788,338 B1 9/2004 Dinev et al.
7,978,239 B2 * 7/2011 Deever ................ H04N 5/2258
348/262

(Continued)

FOREIGN PATENT DOCUMENTS

EP 2 549 763 A2 1/2013
GB 2 449 982 A 12/2008
(Continued)

OTHER PUBLICATIONS

International Search Report and Written Opinion dated Sep. 27, 2017 in counterpart International Patent Application No. PCT/KR2017/006777.
Extended European Search Report for EP Application No. 17820514.2 dated Feb. 13, 2019.

*Primary Examiner* — Lin Ye
*Assistant Examiner* — John H Morehead, III
(74) *Attorney, Agent, or Firm* — Nixon & Vanderhye P.C.

(57) ABSTRACT

An image processing apparatus and method for converting a frame rate are provided. According to the present disclosure, an electronic device includes a memory, a first black-and-white image sensor, a second image sensor, and a processor. The processor is configured to set different values as a first setting value for the first black-and-white image sensor and a second setting value for the second image sensor, if an illuminance value indicating an illuminance at an arbitrary time point does not satisfy a predetermined illuminance value, to acquire a black-and-white image of an object based on the first setting value using the first black-and-white image sensor, to acquire at least one color image of the
(Continued)

object based on the second setting value using the second image sensor, to generate a color image by synthesizing the black-and-white image with a color determined based on at least part of color information of the at least one color image, and to store the generated color image as video data in the memory. The black-and-white image has a high resolution relative to a resolution of the at least one color image.

18 Claims, 11 Drawing Sheets

(51) Int. Cl.
| | | |
|---|---|---|
| *H04N 5/235* | (2006.01) | |
| *H04N 9/09* | (2006.01) | |
| *H04N 9/73* | (2006.01) | |
| *H04N 9/77* | (2006.01) | |
| *H04N 7/01* | (2006.01) | |

(52) U.S. Cl.
CPC ......... *H04N 5/2353* (2013.01); *H04N 5/2355* (2013.01); *H04N 9/09* (2013.01); *H04N 9/735* (2013.01); *H04N 7/0127* (2013.01); *H04N 9/77* (2013.01)

(58) Field of Classification Search
CPC ........ H04N 5/2353; H04N 9/045; H04N 9/77; H04N 9/735; H04N 9/09; H04N 7/0127
See application file for complete search history.

(56) References Cited

U.S. PATENT DOCUMENTS

| | | | |
|---|---|---|---|
| 9,319,585 | B1 | 4/2016 | Liu et al. |
| 9,473,708 | B1* | 10/2016 | D'Amico ............. H04N 13/243 |
| 2007/0024931 | A1* | 2/2007 | Compton ............... H04N 9/045 |
| | | | 358/512 |
| 2007/0052810 | A1* | 3/2007 | Monroe ................. G02B 13/16 |
| | | | 348/211.11 |
| 2008/0055683 | A1 | 3/2008 | Choe et al. |
| 2009/0086074 | A1 | 4/2009 | Li et al. |
| 2011/0176024 | A1* | 7/2011 | Kwon ................. H04N 5/23232 |
| | | | 348/222.1 |
| 2013/0141522 | A1* | 6/2013 | McClatchie ........... H04N 5/217 |
| | | | 348/36 |
| 2013/0229544 | A1* | 9/2013 | Bando .................... H04N 9/093 |
| | | | 348/222.1 |
| 2013/0300887 | A1 | 11/2013 | Ward et al. |
| 2014/0354853 | A1 | 12/2014 | Venkataraman et al. |
| 2015/0062382 | A1 | 3/2015 | Cote et al. |
| 2016/0028965 | A1* | 1/2016 | Horii ...................... H04N 5/225 |
| | | | 348/333.01 |

FOREIGN PATENT DOCUMENTS

| | | |
|---|---|---|
| JP | 2013-0225724 | 10/2013 |
| JP | 2015-177258 | 10/2015 |
| KR | 10-0843087 | 7/2008 |
| KR | 10-1477505 | 1/2015 |
| WO | 2005/057922 | 6/2005 |

* cited by examiner

<S6 Image>         <Result Image>

APPARATUS AND METHOD FOR PROCESSING IMAGE

CROSS-REFERENCE TO RELATED APPLICATION

This application is based on and claims priority under 35 U.S.C. § 119 to a Korean patent application filed in the Korean Intellectual Property Office on Jun. 27, 2016 and assigned Serial No. 10-2016-0080143, the disclosure of which is incorporated by reference herein in its entirety.

TECHNICAL FIELD

The present disclosure relates generally to an apparatus and method for processing images acquired by means of a plurality of image sensors.

BACKGROUND

Along with convergence between broadcasting service and communication service, video communication service has recently become popular. The video communication service is based on a broadband network that provides information at high rates as well as terminals capable of fast processing information.

A terminal supporting the video communication service consumes much power for image processing. Particularly, the resolution of an image to be processed may be a significant factor that determines power consumption of the terminal during display. For example, power consumption during display may increase in proportion to the resolution of an image to be processed in a terminal that can be carried with a user (hereinafter, referred to as 'portable terminal').

The increase of the image resolution leads to an increase in the bandwidth of a link via which information about the image to be processed is transmitted. For example, a bandwidth in which an application processor (AP) of a device transmits a frame to a display device increases in proportion to a display resolution. In another example, if one device transmits multimedia data to another device over a wireless network, a bandwidth to be used in the wireless network may increase in proportion to the size of the multimedia data.

Due to the development of output devices (for example, displays) and users' demands for images with improved quality, the resolution of an image displayed through an output device and the size of the image may increase. In this context, various image processing techniques have been developed to improve the quality of large, complex images in an electronic device. One of the image processing techniques is high dynamic range (HDR). HDR is a technology of successively capturing pictures having different brightness levels and synthesizing at least two pictures into one picture.

The electronic device may use a large amount of resources in processing high-quality or large-capacity images. For example, to compute a large amount of data related to conversion or correction of high-quality images, the electronic device may use a relatively large amount of memory or processing resources. Further, the electronic device may use a relatively large amount of network resources to increase the amount of transmitted data or a transmission rate, for transmission of large-capacity images to another electronic device.

The electronic device is capable of converting the format of an image to a specific image format in order to process high-quality images and transmit large-capacity images. For example, the electronic device may process images by converting the red, green, blue (RGB) color format of an image including red, green, and blue components to a YCbCr image format including a luminance (or luma) component, a blue chrominance (or chroma) component, and a red chrominance (or chroma) component. For example, the electronic device may control (for example, increase) the brightness of an image by controlling (for example, increasing) the luminance component of the YCbCr image format of the image.

The image quality of an electronic device may be proportional to the performance of a lens, an image sensor, and so on provided in the electronic device. However, the use of a high-performance lens, image sensor, and the like in the electronic device to achieve high-quality images may increase manufacture cost for the electronic device.

Accordingly, there is a need for a method for acquiring a high-resolution image by changing a capturing condition and efficiently processing an image, while maintaining the hardware performance of a lens, an image sensor, and so on in an electronic device.

The above information is presented as background information only to assist with an understanding of the present disclosure.

SUMMARY

An example aspect of the present disclosure addresses at least the above-mentioned problems and/or disadvantages and provides at least the advantages described below. Accordingly, an example aspect of the present disclosure is to provide an image processing apparatus and method for converting a frame rate by means of two sensors having different characteristics.

Another example aspect of the present disclosure is to provide an image processing apparatus and method for generating a new image by synthesizing images having different characteristics, acquired by means of two sensors having different characteristics.

Another example aspect of the present disclosure is to provide an image processing apparatus and method for generating a new image based on a plurality of images acquired by means of at least two sensors for which different capturing conditions are set.

Another example aspect of the present disclosure is to provide an image processing apparatus and method for generating a high-resolution color image through image synthesis between a high-resolution black-and-white image acquired by a black-and-white image sensor and a low-resolution color image acquired by a color image sensor, in a low-illumination situation.

Another example aspect of the present disclosure is to provide an image processing apparatus and method for capturing an object by activating a black-and-white image sensor and deactivating a color image sensor in an ultra-low-illumination situation.

In accordance with an example aspect of the present disclosure, an electronic device is provided. The electronic device includes a memory, a first black-and-white image sensor, a second image sensor, and a processor. The processor is configured to set different values as a first setting value for the first black-and-white image sensor and a second setting value for the second image sensor, if an illuminance value indicating an illuminance at an arbitrary time point does not satisfy a predetermined illuminance value, to acquire a black-and-white image of an object based on the first setting value using the first black-and-white image sensor, to acquire at least one color image of the object based on the second setting value using the second image sensor, to generate a color image by synthesizing the black-and-white image with a color determined based on at least part of color information of the at least one color image, and to store the generated color image as video data in the memory. The black-and-white image has a high resolution relative to a resolution of the at least one color image.

In accordance with another example aspect of the present disclosure, a method of operating an electronic device including a first black-and-white image sensor, and a second image sensor is provided. The method includes, setting different values as a first setting value for the first black-and-white image sensor and a second setting value for the second image sensor if an illuminance value indicating an illuminance at an arbitrary time point does not satisfy a predetermined illuminance value, acquiring a black-and-white image of an object based on the first setting value using the first black-and-white image sensor, acquiring at least one color image of the object based on the second setting value using the second image sensor, generating a color image by synthesizing the black-and-white image with a color determined based on at least part of color information of the at least one color image, and storing the generated color image as video data in a memory. The black-and-white image has a high resolution relative to a resolution of the at least one color image.

In accordance with another example aspect of the present disclosure, a computer-readable recording medium storing a program for controlling an electronic device is provided. The electronic device including a first black-and-white image sensor, and a second image sensor, and the program, when executed by a processor, causes the electronic device to perform at least one operation, including, setting different values as a first setting value for the first black-and-white image sensor and a second setting value for the second image sensor if an illuminance value indicating an illuminance at an arbitrary time point does not satisfy a predetermined illuminance value, acquiring a black-and-white image of an object based on the first setting value using the first black-and-white image sensor, acquiring at least one color image of the object based on the second setting value using the second image sensor, generating a color image by synthesizing the black-and-white image with a color determined based on at least part of color information of the at least one color image, and storing the generated color image as video data in a memory. The black-and-white image has a high resolution relative to a resolution of the at least one color image.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and attendant advantages of the present disclosure will be more apparent and readily appreciated from the following detailed description, taken in conjunction with the accompanying drawings, in which like reference numerals refer to like elements, and wherein.

Throughout the drawings, like reference numerals will be understood to refer to like parts, components, and structures.

DETAILED DESCRIPTION

Figure 1:
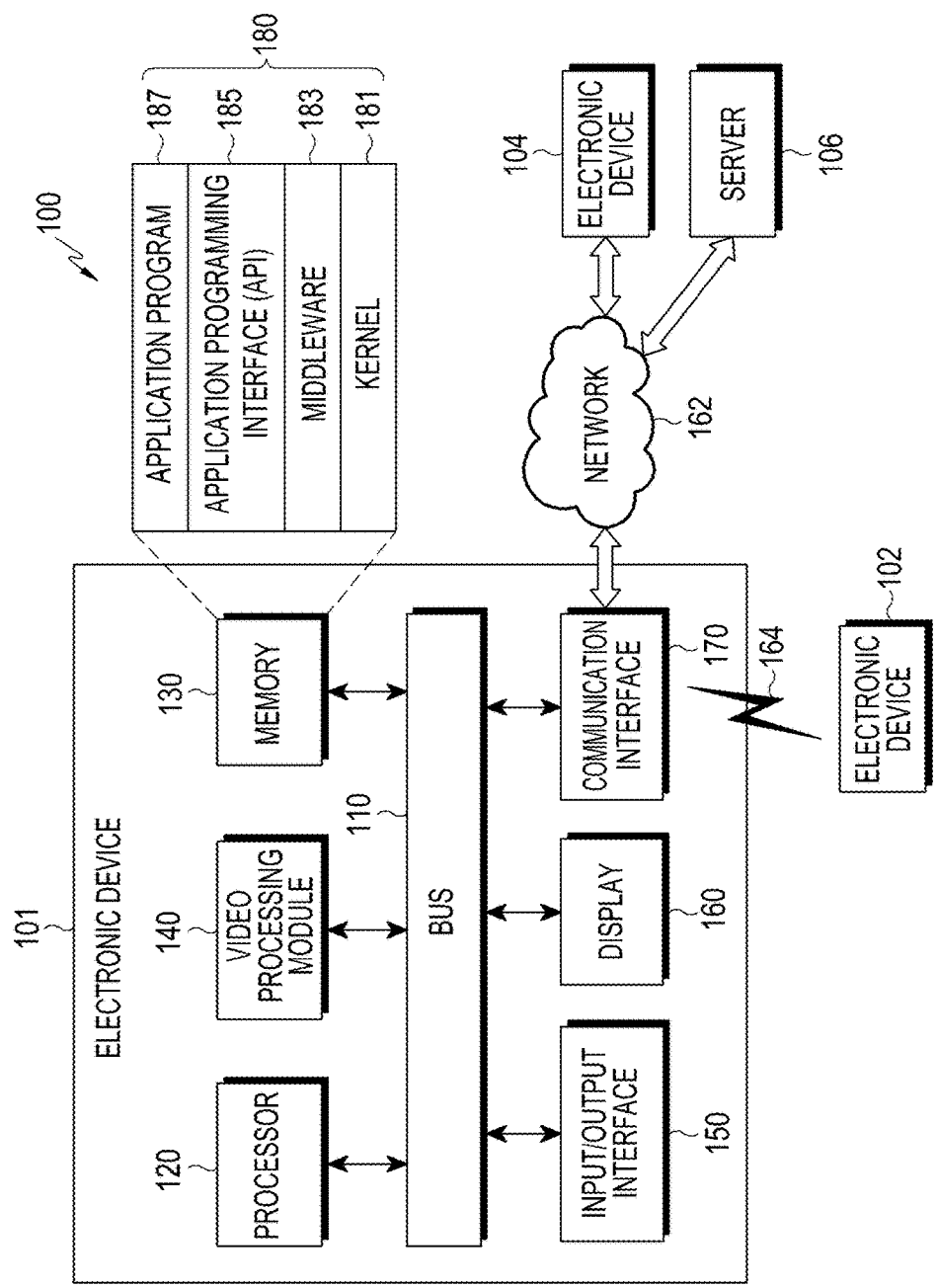
FIG. 1 is a diagram illustrating an example network environment including a wireless terminal according to various example embodiments.

Various example embodiments of the present disclosure are described with reference to the accompanying drawings. However, the various examples set forth herein are not intended to be limited to the particular embodiments, and it is to be understood that the present disclosure covers various modifications, equivalents, and/or alternatives falling within the scope and spirit of the present disclosure. In relation to a description of the drawings, like reference numerals denote the same components.

In the present disclosure, the term 'have', 'may have', 'include', or 'may include' signifies the presence of a specific feature (for example, number, function, operation, or component such as a part), not excluding the presence of one or more other features.

In the present disclosure, the term 'A or B', 'at least one of A or/and B', or 'one or more of A or/and B' may cover all possible combinations of enumerated items. For example, 'A or B', 'at least one of A and B', or 'at least one of A or B' may represent all of the cases of (1) inclusion of at least one A, (2) inclusion of at least one B, and (3) inclusion of at least one A and at least one B.

The term as used in the present disclosure, 'first' or 'second' may modify the names of various components irrespective of sequence and/or importance. These expressions are used to distinguish one component from another component, not limiting the components. For example, a first user equipment (UE) and a second UE may indicate different UEs irrespective of sequence or importance. For example, a first component may be referred to as a second component and vice versa without departing from the scope of the present disclosure.

When a component (for example, a first component) is '(operatively or communicatively) coupled with/to' or 'connected to' another component (for example, a second component), it should be understood that the one component is connected to the other component directly or through any other component (for example, a third component). On the other hand, when it is said that a component (for example, a first component) is 'directly connected to' or 'directly coupled to' another component (for example, a second component), it may be understood that there is no other component (for example, a third component) between the components.

The term 'configured to' as used herein may be used interchangeably with, for example, the term 'suitable for' 'having the capacity to', 'designed to', 'adapted to', 'made to', or 'capable of' under circumstances. The term 'configured to' may not necessarily mean 'specifically designed to' in hardware. Instead, the term 'configured to' may refer to a situation in which a device is 'capable of' with another device or part. For example, 'a processor configured to execute A, B, and C' may refer, for example, to a dedicated processor (for example, an embedded processor) for performing the corresponding operations or a generic-purpose processor (for example, a central processing unit (CPU) or an application processor (AP)) for performing the operations.

The terms as used in the present disclosure are provided merely to describe specific embodiments, not intended to limit the scope of other embodiments. It is to be understood that singular forms include plural referents unless the context clearly dictates otherwise. Unless otherwise defined, the terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. Even where the terms are defined in the present disclosure the terms may not be interpreted as excluding embodiments of the present disclosure.

According to various example embodiments of the present disclosure, an electronic device may be at least one of, for example, a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, mobile medical equipment, a camera, or a wearable device, or the like, but is not limited thereto. According to various embodiments, the wearable device may be at least one of an accessory type (for example, a watch, a ring, a bracelet, an ankle bracelet, a necklace, glasses, contact lenses, or a head-mounted device (HMD)), a fabric or clothes type (for example, electronic clothes), an attached type (for example, a skin pad or a tattoo), or an implantable type (for example, an implantable circuit), or the like, but is not limited thereto.

According to some embodiments, an electronic device may be a home appliance. The home appliance may be at least one of, for example, a television (TV), a digital versatile disk (DVD) player, an audio player, a refrigerator, an air conditioner, a vacuum cleaner, an oven, a microwave oven, a washer, an air purifier, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic picture frame, or the like, but is not limited thereto.

According to other embodiments, an electronic device may be at least one of a medical device (for example, a portable medical meter such as a blood glucose meter, a heart rate meter, a blood pressure meter, or a body temperature meter, a magnetic resonance angiography (MRA) device, a magnetic resonance imaging (MRI) device, a computed tomography (CT) device, an imaging device, an ultrasonic device, or the like), a navigation device, a global positioning system (GPS) receiver, an event data recorder (EDR), a flight data recorder (FDR), an automotive infotainment device, a naval electronic device (for example, a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, or an Internet of things (IoT) device (for example, a lighting bulb, various sensors, an electricity or gas meter, a sprinkler, a fire alarm, a thermostat, a street lamp, a toaster, sports goods, a hot water tank, a heater, or a boiler), or the like, but is not limited thereto.

According to some embodiments, an electronic device may be at least one of furniture, part of a building/structure, an electronic board, an electronic signature receiving device, a projector, and various measuring devices (for example, water, electricity, gas or electro-magnetic wave measuring devices), or the like, but is not limited thereto. According to various embodiments, an electronic device may be one or a combination of two or more of the foregoing devices. According to some embodiments, an electronic device may be a flexible electronic device. According to an embodiment of the present disclosure, an electronic device may cover a new electronic device which will emerge owing to technology development, not limited to the foregoing devices.

Various embodiments of the present disclosure provide a method for acquiring a color image having a high frame rate (a high-quality, high-pixel color image) by matching a color image having a relatively low frame rate (a low-quality, low-pixel color image) to a black-and-white (BW) image having a relatively high frame rate (a high-quality, high-pixel BW image). In order to acquire a color image having a high frame rate, many techniques for matching between a color image having a low frame rate and a BW image having a high frame rate may be available. In one of the techniques, a color image having a high frame rate (a high-quality color image) may be generated by diffusing colors into a BW image having a high frame rate (a high-quality BW image) based on color information that may be acquired from a color image having a low frame rate.

With reference to the attached drawings, an electronic device according to various embodiments will be described below. In the present disclosure, the term 'user' refers to a person or device (for example, intelligent electronic device) that uses an electronic device.

FIG. 1 is a diagram illustrating an electronic device 101 in a network environment 100 according to various example embodiments. The electronic device 101 may include a bus 110, a processor (e.g., including processing circuitry) 120, a memory 130, an input/output (I/O) interface (e.g., including input/output circuitry) 150, a display 160, a communication interface (e.g., including communication circuitry) 170, and a video processing module (e.g., including video processing circuitry) 140. In some embodiments, at least one of the components may be omitted in the electronic device 101 or a component may be added to the electronic device 101.

The bus 110 may include a circuit that interconnects, for example, the foregoing components 120, 130, 150, 160, and 170 and allows communication (for example, control messages and/or data) between the foregoing components.

The processor 120 may include various processing circuitry, such as, for example, and without limitation, one or more of a dedicated processor, a CPU, an AP, or a communication processor (CP). The processor 120 may, for example, execute computation or data processing related to control and/or communication of at least one other component of the electronic device 101.

The memory 130 may include a volatile memory and/or a non-volatile memory. The memory 130 may, for example, store instructions or data related to at least one other component of the electronic device 101. According to an embodiment, the memory 130 may store software and/or programs 180. The programs 180 may include, for example, a kernel 181, middleware 183, an application programming interface (API) 185, and/or application programs (or applications) 187. At least a part of the kernel 181, the middleware 183, and the API 185 may be called an operating system (OS).

The kernel 181 may control or manage system resources (for example, the bus 110, the processor 120, or the memory 130) that are used in executing operations or functions implemented in other programs (for example, the middleware 183, the API 185, or the application programs 187). Also, the kernel 181 may provide an interface for allowing the middleware 183, the API 185, or the application programs 187 to access individual components of the electronic device 101 and control or manage system resources.

The middleware 183 may serve as a medium through which the kernel 181 may communicate with, for example, the API 185 or the application programs 187 to transmit and receive data.

Also, the middleware 183 may process one or more task requests received from the application programs 187 according to their priority levels. For example, the middleware 183 may assign priority levels for using system resources (the bus 110, the processor 120, or the memory 130) of the electronic device 101 to at least one of the application programs 187. For example, the middleware 183 may process the one or more task requests according to the priority levels, thereby achieving scheduling or load balancing of the one or more task requests.

The API 185 is, for example, an interface for the applications 187 to control functions that the kernel 181 or the middleware 183 provides. For example, the API 185 may include at least one interface or function (for example, a command) for file control, window control, video processing, or text control.

The I/O interface 150 may serve, for example, as an interface for providing a command or data received from a user or an external device to the other component(s) of the electronic device 101. Further, the I/O interface 150 may output a command or data received from the other component(s) of the electronic device 101 to the user or the external device. For example, the I/O interface 150 may include various input/output circuitry, such as, for example, and without limitation, a plurality of image sensors having different characteristics. The I/O interface 150 may provide images captured by the plurality of image sensors to the video processing module 140, the memory 130, the display 160, the communication interface 170, and so on through the bus 110. The captured images may have different image characteristics, which may be attributed to different characteristics of the image sensors, different capturing conditions, and the like.

The display 160 may include, for example, a liquid crystal display (LCD), a light emitting diode (LED) display, an organic LED (OLED) display, a microelectromechanical systems (MEMS) display, or an electronic paper display, or the like, but is not limited thereto. The display 160 may display, for example, various types of content (for example, text, an image, a video, an icon, or a symbol). The display 160 may include a touch screen and receive, for example, a touch input, a gesture input, a proximity input, or a hovering input through an electronic pen or a user's body part.

The communication interface 170 may include various communication circuitry and establish communication, for example, between the electronic device 101 and an external device (for example, a first external electronic device 102, a second external electronic device 104, or a server 106). For example, the communication interface 170 may be connected to a network 162 by wireless communication or wired communication, and communicate with the external device (for example, the second external electronic device 104 or the server 106) over the network 162. Additionally, the communication interface 170 may establish a short-range wireless communication connection 164 with an external electronic device (e.g., first external electronic device 102).

The wireless communication may be conducted in conformance to, for example, at least one of long term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM), as a cellular communication protocol. Further, the wireless communication may include short-range communication 164. The short-range communication 164 may be conducted in conformance to, for example, at least one of wireless fidelity (WiFi), Bluetooth, near field communication (NFC), magnetic secure transmission (MST), or Zigbee. The wireless communication may include, for example, GPS or GNSS. GNSS may be, for example, global positioning system (GPS) or global navigation satellite system (GNSS). The wired communication may be conducted in conformance to, for example, at least one of universal serial bus (USB), high definition multimedia interface (HDMI), recommended standard 232 (RS-232), or plain old telephone service (POTS). The network 162 may be a telecommunication network, for example, at least one of a computer network (for example, local area network (LAN) or wide area network (WAN)), the Internet, or a telephone network.

The video processing module 140 may include various video processing circuitry and acquire additional information (for example, binary data, high-frequency component information, color information, brightness information, pattern information, motion information, or black label value of edge information or scale information) based on, for example, part of the edge information (for example, the high-frequency component information) or scale information (for example, a down-scaled image) related to an input image, and generate an output image corresponding to at least a part of the input image based on the acquired additional information. The video processing module 140 may, for example, up-scale the down-scaled input image included in the scale information and generate the output image using the up-scaled input image and the edge information.

The video processing module 140 may generate a new image based on a plurality of images received from a plurality of image sensors having different characteristics in the I/O interface 150. That is, the video processing module 140 may generate an image having new characteristics by extracting information about the characteristics of the plurality of image sensors from images in which the characteristics have been reflected, and processing an image having different characteristics, using the extracted information.

According to an example embodiment, the video processing module 140 may acquire a color image having a relatively low resolution from a color image sensor being one of the plurality of image sensors, and a BW image having a relatively high resolution from a BW image sensor being another one of the plurality of image sensors. In this case, the video processing module 140 may generate a color image having a high resolution by synthesizing or matching the BW image having the relatively high resolution with the color image having the relatively low resolution.

In an example, the video processing module 140 may generate a color image having a high resolution by acquiring color information from a color image having a relatively low resolution, and diffusing colors into a BW image having a relatively high resolution, using the acquired color information.

While the video processing module 140 is illustrated in FIG. 1 as a component independent of the processor 120 and the memory 130, this does not limit various embodiments. For example, the video processing module 140 may be integrated with the processor 120, or may be stored in the form of software in the memory 130 and executed by the processor 120. Further, the video processing module 140 may, for example, be distributed to the processor 120 and the memory 130.

Each of the first and second external electronic devices 102 and 104 may be of the same type as or a different type from the electronic device 101. According to an embodiment, the server 106 may include a group of one or more servers. According to various embodiments, all or a part of operations performed in the electronic device 101 may be performed in one or more other electronic devices (for example, the electronic devices 102 and 104, or the server 106). According to an embodiment, if the electronic device 101 is to perform a function or a service automatically or upon request, the electronic device 101 may request at least a part of functions related to the function or the service to another device (for example, the electronic device 102 or 104 or the server 106), instead of performing the function or the service autonomously, or additionally. The other electronic device (for example, the electronic device 102 or 104 or the server 106) may execute the requested function or an additional function and provide a result of the function execution to the electronic device 101. The electronic device 101 may provide the requested function or service based on the received result or by additionally processing the received result. For this purpose, for example, cloud computing, distributed computing, or client-server computing may be used.

Figure 2:
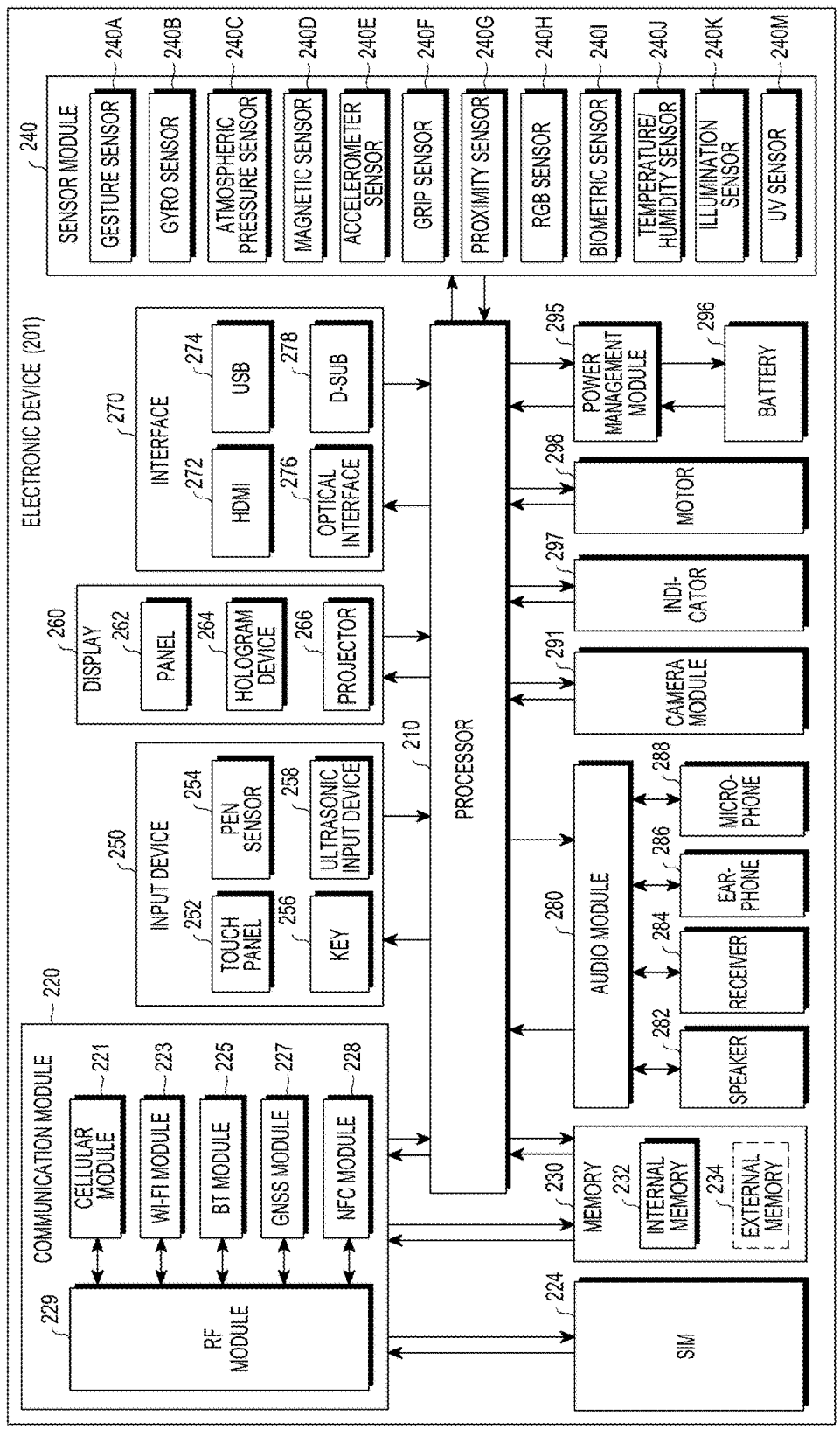
FIG. 2 is a block diagram illustrating an example wireless terminal according to various example embodiments.

FIG. 2 is a block diagram illustrating an example electronic device 201 according to various example embodiments of the present disclosure.

Referring to FIG. 2, the electronic device 201 may include, for example, the whole or part of the electronic device 101 illustrated in FIG. 1. The electronic device 201 may include at least one processor (for example, AP) (e.g., including processing circuitry) 210, a communication module (e.g., including communication circuitry) 220, a subscriber identification module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and may, for example, control a plurality of hardware or software components that are connected to the processor 210 by executing an OS or an application program, and may process or compute various types of data. The processor 210 may be implemented, for example, as a system on chip (SoC). According to an embodiment, the processor 210 may further include a graphics processing unit (GPU) and/or an image signal processor. The processor 210 may include at least a part (for example, a cellular module 221) of the components illustrated in FIG. 2. The processor 210 may load a command or data received from at least one of other components (for example, a non-volatile memory), process the loaded command or data, and store result data in the non-volatile memory.

The communication module 220 may have the same configuration as or a similar configuration to the communication interface 170 illustrated in FIG. 1. The communication module 220 may include various communication circuitry, such as, for example, and without limitation, the cellular module 221, a WiFi module 223, a Bluetooth (BT) module 225, a GPS module 227, an NFC module 228, and a radio frequency (RF) module 229.

The cellular module 221 may, for example, provide voice call, video call, text service, the Internet service, or the like through a communication network. According to an embodiment, the cellular module 221 may identify and authenticate the electronic device 201 within a communication network, using the SIM (for example, a SIM card) 224. According to an embodiment, the cellular module 221 may perform at least a part of the functionalities of the processor 210. According to an embodiment, the cellular module 221 may include a CP.

Each of the WiFi module 223, the BT module 225, the GPS module 227, or the NFC module 228 may include, for example, a processor for processing data transmitted and received by the module. According to an embodiment, at least a part (two or more) of the cellular module 221, the WiFi module 223, the BT module 225, the GPS module 227, or the NFC module 228 may be included in a single integrated chip (IC) or IC package.

The RF module 229 may transmit and receive, for example, communication signals (for example, RF signals). The RF module 229 may include, for example, a transceiver, a power amplifier module (PAM), a frequency filter, a low noise amplifier (LNA), an antenna, or the like. According to another embodiment, at least one of the cellular module 221, the WiFi module 223, the BT module 225, the GPS module 227, or the NFC module 228 may transmit and receive RF signals via a separate RF module.

The SIM 224 may include, for example, a card including the SIM and/or an embedded SIM. The SIM 224 may include a unique identifier (for example, integrated circuit card identifier (ICCID)) or subscriber information (for example, international mobile subscriber identity (IMSI)).

The memory 230 (for example, the memory 130) may include, for example, an internal memory 232 and/or an external memory 234. The internal memory 232 may be at least one of, for example, a volatile memory (for example, dynamic RAM (DRAM), static RAM (SRAM), or synchronous dynamic RAM (SDRAM)), and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash or NOR flash), a hard drive, and a solid state drive (SSD)).

The external memory 234 may include a flash drive such as a compact flash (CF) drive, a secure digital (SD), a micro secure digital (micro-SD), a mini secure digital (mini-SD), an extreme digital (xD), a multi-media card (MMC), or a memory stick. The external memory 234 may be operatively and/or physically coupled to the electronic device 201 via various interfaces.

The sensor module 240 may, for example, measure physical quantities or detect operational states of the electronic device 201, and convert the measured or detected information into electrical signals. The sensor module 240 may include at least one of, for example, a gesture sensor 240A, a gyro sensor 240B, an atmospheric pressure sensor 240C, a magnetic sensor 240D, an accelerometer sensor 240E, a grip sensor 240F, a proximity sensor 240G, a color sensor (for example, a red, green, blue (RGB) sensor) 240H, a biometric sensor 240I, a temperature/humidity sensor 240J, an illumination sensor 240K, or an ultra violet (UV) sensor 240M. Additionally or alternatively, the sensor module 240 may include, for example, an electrical-nose (E-nose) sensor, an electromyogram (EMG) sensor, an electroencephaloeram (EEG) sensor, an electrocardiogram (ECG) sensor, an infrared (IR) sensor, an iris sensor, and/or a finger print sensor. The sensor module 240 may further include a control circuit for controlling one or more sensors included therein. According to some embodiments, the electronic device 201 may further include a processor configured to control the sensor module 240, as a part of or separately from the processor 210. Thus, while the processor 210 is in a sleep state, the control circuit may control the sensor module 240.

The input device 250 may include various input circuitry, such as, for example, and without limitation, a touch panel 252, a (digital) pen sensor 254, a key 256, or an ultrasonic input device 258. The touch panel 252 may operate in at least one of, for example, capacitive, resistive, infrared, and ultrasonic schemes. The touch panel 252 may further include a control circuit. The touch panel 252 may further include a tactile layer to thereby provide haptic feedback to the user.

The (digital) pen sensor 254 may include, for example, a detection sheet which is a part of the touch panel or separately configured from the touch panel. The key 256 may include, for example, a physical button, an optical key, or a keypad. The ultrasonic input device 258 may sense ultrasonic signals generated by an input tool using a microphone, and identify data corresponding to the sensed ultrasonic signals.

The display 260 may include a panel 262, a hologram device 264, or a projector 266.

The panel 262 may have the same configuration as or a similar configuration to the display 160 illustrated in FIG. 1. The panel 262 may be configured to be, for example, flexible, transparent, or wearable. The panel 262 and the touch panel 252 may be implemented as a single module.

According to an embodiment, the panel 262 may include at least one sensor. For example, the panel 262 may include a pressure sensor (or a force sensor). The pressure sensor may measure the strength of the pressure of a user touch. The pressure sensor may be integrated with the touch panel 252, or configured as one or more sensors separately from the touch panel 252.

The hologram device 264 may utilize the interference of light waves to provide a three-dimensional image in empty space. The projector 266 may display an image by projecting light on a screen. The screen may be positioned, for example, inside or outside the electronic device 201. According to an embodiment, the display 260 may further include a control circuit for controlling the panel 262, the hologram device 264, or the projector 266.

The interface 270 may include various interface circuitry, such as, for example, and without limitation, an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, an SD/multimedia card (MMC) interface, or an infrared data association (IrDA) interface.

The audio module 280 may, for example, convert a sound to an electrical signal, and vice versa. At least a part of the components of the audio module 280 may be included, for example, in the I/O interface 150 illustrated in FIG. 1. The audio module 280 may process sound information input into, or output from, for example, a speaker 282, a receiver 284, an earphone 286, or a microphone 288.

The camera module 291 may capture, for example, still images and a video. According to an embodiment, the camera module 291 may include one or more image sensors (for example, a front sensor or a rear sensor), a lens, an image signal processor (ISP), or a flash (for example, an LED or a xenon lamp). That is, the camera module 291 may include a plurality of image sensors having different characteristics. The different characteristics, which are a factor that determine the characteristics of captured images, may be characteristics in terms of image type (BW, color, and so on), resolution, angle of view, and so on.

For example, the camera module 291 may be configured with a set of image sensors supporting different resolutions. That is, the set of image sensors included in the camera module 291 may include an image sensor having a high resolution and an image sensor having a low resolution, an image sensor for acquiring a BW image and an image sensor for acquiring a color image, or an image sensor having a wide angle of view and an image sensor having a narrow angle of view. Besides, the camera module 291 may be configured to include a set of image sensors in consideration of various characteristics. That is, the set of image sensors may include a BW image sensor for acquiring a BW image having a relatively high resolution and a color image sensor for acquiring a color image having a relatively low resolution.

The camera module 291 may set different capturing conditions for the plurality of image sensors. For example, the capturing conditions may include an exposure value, a shutter speed, an iris value, white balance, sensitivity, and so on. The plurality of image sensors may generate different resulting images according to the set capturing conditions.

The power management module 295 may manage power of, for example, the electronic device 201. According to an embodiment, the power management module 295 may include a power management integrated circuit (PMIC), a charger IC, or a battery 296 or fuel gauge. The PMIC may adopt wired and/or wireless charging. The wireless charging may be performed, for example, in a magnetic resonance scheme, a magnetic induction scheme, or an electromagnetic wave scheme, and may further include an additional circuit for wireless charging, for example, a coil loop, a resonance circuit, or a rectifier. The battery gauge may measure, for example, a charged level, a voltage while charging, current, or temperature of the battery 296. The battery 296 may include, for example, a rechargeable battery and/or a solar battery.

The indicator 297 may indicate specific states of the electronic device 201 or a part of the electronic device 201 (for example, the processor 210), for example, boot status, message status, or charge status. A motor 298 may convert an electrical signal to mechanical vibrations, and generate vibrations, haptic effect, or the like. While not shown, the electronic device 201 may include, for example, a mobile TV support device (for example, a GPU) for processing media data compliant with, for example, digital multimedia broadcasting (DMB), digital video broadcasting (DVB), or MediaFLO™.

Each of the above-described components of the electronic device may include one or more parts and the name of the component may vary with the type of the electronic device. According to various embodiments, an electronic device may be configured to include at least one of the above-described components. Some component may be omitted from or added to the electronic device. Further, one entity may be configured by combining a part of the components of the electronic device, to thereby perform the same functions of the components prior to the combining.

Figure 3:
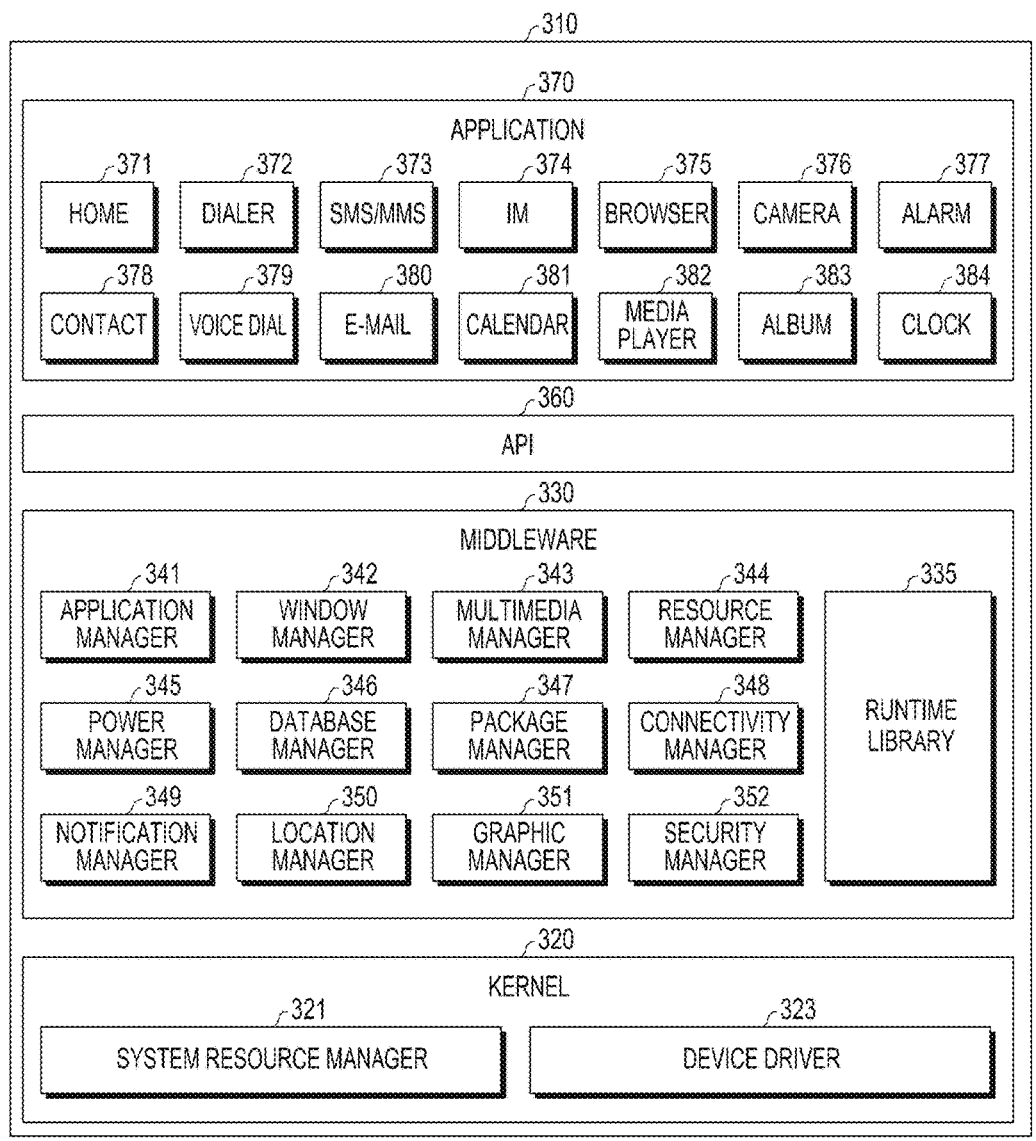
FIG. 3 is a block diagram illustrating an example programming module according to various example embodiments.

FIG. 3 is a block diagram illustrating an example programming module according to various example embodiments.

Referring to FIG. 3, a programming module 310 (for example, a program 180) may include an OS that controls resources related to an electronic device and/or various applications executed on the OS (for example, the application programs 187). For example, the OS may be Android™, iOS™, Windows™, Symbian™, Tizen™, or Bada™.

The programming module 310 may include a kernel 320, middleware 330, an application programming interface (API) 360, and/or applications 370. At least part of the programming module 310 may be preloaded on the electronic device or downloaded from an external electronic device (for example, the electronic device 102 or 104, or the server 106).

An example of the kernel 320, the middleware 330, the API 360, and the applications 370 included in the programming module 310 may be the kernel 181, the middleware 183, the API 185, and the applications 187 included in the program 180 illustrated in FIG. 1.

The kernel 320 may include, for example, a system resource manager 321 and/or a device driver 323. The system resource manager 321 may control, allocate, or deallocate system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may, for example, provide a function required commonly for the applications 370 or provide various functionalities to the applications 370 through the API 360 so that the applications 370 may use limited system resources available within the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a complier uses to add a new function in a programming language during execution of an application 370. The runtime library 335 may perform input/output management, memory management, or arithmetic function processing.

The application manager 341 may manage, for example, the life cycle of at least one of the applications 370. The window manager 342 may manage GUI resources used for a screen. The multimedia manager 343 may determine formats required to play back various media files and may encode or decode a media file using a CODEC suitable for the format of the media file. The resource manager 344 may manage a source code or a memory or storage space.

The power manager 345 may, for example, manage a battery or a power source and provide power information required for an operation of the electronic device, in conjunction with a basic input/output system (BIOS). The database manager 346 may, for example, generate, search, or modify a database to be used for the applications 370. The package manager 347 may manage installation or update of an application distributed as a package file.

The connectivity manager 348 may manage, for example, wireless connectivity such as WiFi or Bluetooth. The notification manager 349 may provide a user with an event such as message arrival, a schedule, a proximity notification, or the like in a manner that does not bother the user. The location manager 350 may mange position information about the electronic device. The graphic manager 351 may manage graphical effects to be provided to the user or related user interfaces. The security manager 352 may provide various security functions required for system security or user authentication. According to an embodiment, if the electronic device is equipped with a telephone function, the middleware 330 may further include a telephony manager to manage a voice or video call function of the electronic device.

The middleware 330 may include a middleware module for combining various functions of the above-described components. To provide differentiated functions, the middleware 330 may provide a customized module for each OS type. Further, the middleware 330 may dynamically delete a part of the existing components or add a new component.

The API 360 is, for example, a set of API programming functions, which may be configured differently according to an OS. For example, in the case of Android or iOS, one API set may be provided per platform, whereas in the case of Tizen, two or more API sets may be provided per platform.

The applications 370 may include one or more applications capable of executing functions such as home 371, dialer 372, short message service/multimedia messaging service (SMS/MMS) 373, instant message (IM) 374, browser 375, camera 376, alarm 377, contacts 378, voice dial 379, email 380, calendar 381, media player 382, album 383, or clock 384. The applications 370 may also include applications capable of executing functions such as health care (for example, measurement of an exercise amount or a glucose level), or provisioning of environment information (for example, information about atmospheric pressure, humidity, or temperature).

According to an embodiment, the applications 370 may include an application supporting information exchange between the electronic device and an external electronic device (for the convenience of description, referred to as 'information exchange application'). The information exchange application may include, for example, a notification relay application for transmitting specific information to the external electronic device, or a device management application for managing the external electronic device.

For example, the notification relay application may transmit notification information generated from another application (for example, the SMS/MMS application, the email application, the health care application, or the environment information application) of the electronic device to the external electronic device. Further, the notification relay application may, for example, receive notification information from the external electronic device and transmit the received notification information to a user.

The device management application may manage (for example, install, delete, or update) at least one function of an external electronic device communicating with the electronic device (for example, turn-on/turn-off of the external electronic device (or a part of its components) or control of the brightness (or resolution) of the display), an application executed in the external electronic device, or a service (for example, a call service or a message service) provided by the external electronic device.

According to an embodiment, the applications 370 may include an application designated according to a property of the external electronic device (for example, a health care application of a mobile medical equipment). According to an embodiment, the applications 370 may include an application received from an external electronic device. According to an embodiment, the applications 370 may include a preloaded application or a third application downloadable from a server. The names of the components of the programming module 310 according to the illustrated embodiment may vary depending on OS types.

According to various embodiments, at least part of the programming module 310 may be realized in software, firmware, hardware, or a combination of at least two of them. At least part of the programming module 310 may be realized (for example, implemented), for example, by a processor (for example, the processor 210). At least part of the programming module 310 may include, for example, a module, a program, a routine, a set of instructions, or a process to execute one or more functions.

The term 'module' as used herein includes a unit including one or a combination of two or more of, for example, hardware, software, or firmware. The term 'module' may be used interchangeably with other terms, for example, unit, logic, logical block, part, or circuit. A 'module' may be the smallest unit of integrated components, or a portion thereof. A 'module' may be the smallest unit for executing one or more functions, or a portion thereof. A 'module' may be implemented mechanically, or electronically. For example, a 'module' may include at least one of a known, or to-be-developed, dedicated processor, CPU, application-specific integrated circuit (ASIC) chip, field-programmable gate array (FPGA) or programmable logic device that performs certain operations.

At least a part of devices (for example, modules or their functions) or methods (for example, operations) according to various embodiments may be implemented as commands stored in a computer-readable storage medium. When the commands are executed by a processor (for example, the processor 120), the processor may execute functions corresponding to the commands. The computer-readable storage medium may be, for example, the memory 130.

The computer-readable storage medium may include hard disk, floppy disk, magnetic media (for example, magnetic tape), optical media (for example, compact disc read-only memory (CD-ROM)), digital versatile disc (DVD), or magneto-optical media (for example, floptical disk)), a hardware device (for example, ROM, RAM, or flash memory), or the like. Program instructions may include a premium language code executable by a computer using an interpreter as well as a machine language code such as a code produced by a compiler. The foregoing hardware device may be configured to operate as one or more software module for performing operations according to various embodiments, and vice versa.

A module or a programming module according to various embodiments of the present disclosure may include one or more of the above-described components, may omit a portion thereof, or may include additional components. Operations that are performed by a module, a programming module or other components according to various embodiments may be processed in a serial, parallel, repetitive or heuristic manner. Or some operations may be performed in a different order or omitted, or other operations may be added. The embodiments of the present disclosure are presented to describe and provide understanding of the present disclosure, not limiting the scope of the present disclosure. Therefore, the scope of the present disclosure should be interpreted as including all modifications or various other embodiments based on the spirit of the present disclosure.

Figure 4:
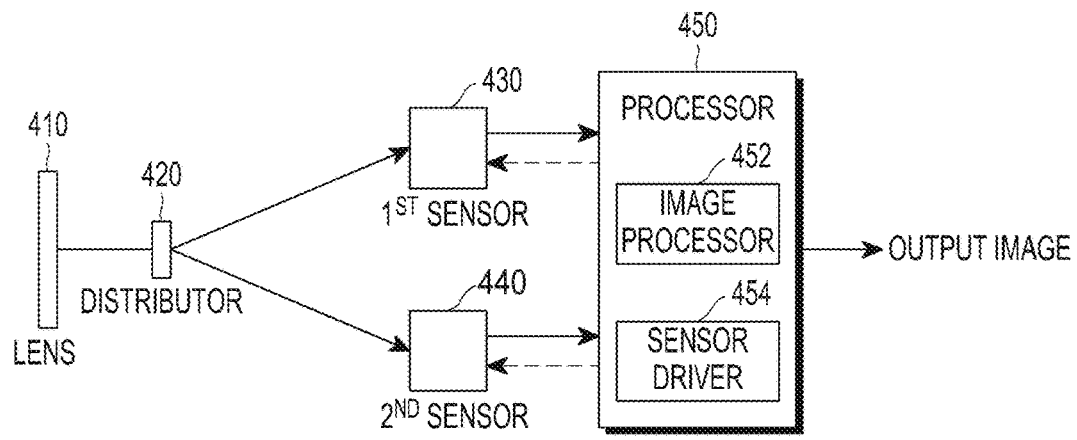
FIG. 4 is a diagram illustrating an example configuration of an image processing apparatus according to various example embodiments.

FIG. 4 is a diagram illustrating an example configuration of an image processing apparatus according to various example embodiments.

Referring to FIG. 4, the image processing apparatus may include a lens 410, a distributor 420, first and second sensors 430 and 440, and a processor (e.g., including processing circuitry) 450. The processor 450 may include an image processor (e.g., including processing circuitry and/or program elements) 452 and a sensor driver 454. While the image processor 452 and the sensor driver 454 are illustrated in FIG. 4 as included in the processor 450, the image processor 452 and the sensor driver 454 may be configured as independent components, separately from the processor 450. Further, while the image processing apparatus includes two sensors in FIG. 4, by way of example, it may include three or more sensors. One lens may be added, and a plurality of sensors may be provided for the added lens.

The lens 410, includes a transparent (e.g., glass) body for refracting light reflected from an object, may be attached in the form of a cylinder onto the front of a camera body irrespective of a camera type such as a TV camera, a film camera, or a photo camera. Typically, the lens 410 executes the same function of reproducing an image of an object, as an eye of a camera, even though the lens 410 has a different shape and size.

Depending on its function, the lens 410 may classified into various types. For example, lenses may classified into a wide-angle lens, a normal lens, a telephoto lens, and a zoom lens according to their focal distances. The lens 410 may also be classified according to its property such as brightness or speed. For example, the brightness or speed of the lens 410 may be a property related to a minimum iris value f. The brightness of the lens 410 refers to a minimum iris value f (a maximum iris opening value).

As the maximum iris opening value increases (the minimum iris value f decreases), more light per unit time may be transmitted (the lens may be brighter). As the lens 410 gets brighter, a faster shutter speed may be obtained, which makes it possible to acquire a brighter image even in a dark capturing environment (an environment in which a small amount of light is received).

The distributor 420 may include an element to distribute the light refracted through the lens 410 into a predetermined number of paths. For example, the light refracted through the lens 410 may be reflected to two paths by means of media such as mirrors, thereby transferring the same light to desired locations.

The first sensor 430 and the second sensor 440 may detect the light provided through the distributor 420, and generate electrical image signals (image frames) based on the detected light. The first sensor 430 and the second sensor 440 may include metal oxide semiconductor (MOS), charge coupled device (CCD), or complementary MOS (CMOS) components. Depending on the types of images represented by electrical image signals, the first sensor 430 and the second sensor 440 may be classified as a BW image sensor and a color image sensor. In general, a main reason for not increasing a frame rate in a sensor is that the amount of light received by the sensor is limited. Other constraints imposed by the number of analog-to-digital converters (ADCs), the bandwidth of a mobile industry processor interface (MIPI), and so on may be issues that can be tackled during fabrication of an image sensor.

The first and second sensors 430 and 440 may have different characteristics according to their components. The characteristics are factors that determine the properties of captured images, including image type (BW, color, and so on), resolution, angle of view, and so on.

For example, the first and second sensors 430 and 440 may support different resolutions. That is, the first sensor 430 may support a high resolution, whereas the second sensor 440 may support a low resolution. Further, the first sensor 430 may generate a BW image based on detected light, whereas the second sensor 440 may generate a color image based on detected light. The first and second sensors 430 and 440 may generate images at different angles of view. Besides, the first sensor 430 and/or the second sensor 440 may differ in a plurality of characteristics. That is, the first sensor 430 may be a BW image sensor capable of acquiring a BW image having a relatively high resolution, whereas the second sensor 440 may be a color image sensor capable of acquiring a color image having a relatively low resolution.

In the same capturing environment (in an environment in which the same amount of light is received, for example, in a low-illumination situation), for example, the BW image sensor may provide a high frame rate (frames per second (fps)) relative to the color image sensor. That is, the BW image sensor may acquire more image frames than the color image sensor during the same time period in the same capturing environment. On the contrary, a BW image acquired by the BW image sensor has a small amount of data relative to a color image acquired by the color image sensor.

For the first and second sensors 430 and 440, independent capturing conditions may be set. For example, different exposure values, shutter speeds (exposure times), sensor sensitivities (international standard organization (ISO) characteristic values), iris values, or the like may be set for the first and second sensors 430 and 440. In this case, an image acquired from the first sensor 430 and an image acquired from the second sensor 440 may have different characteristics.

Based on the above, a plurality of color images having a low resolution and a BW image having a high resolution may be acquired during the same time period by the first and second sensors 430 and 440 for which different capturing conditions are set. That is, a plurality of color images may be captured under a plurality of capturing conditions during the read time of one BW image.

In an ultra-low-illumination environment, for example, image capturing may be attempted only using a BW image sensor (for example, the first image sensor 43), while a color image sensor (for example, the second image sensor 440) is turned off. In this case, a single BW image may be generated by synthesizing a plurality of BW images output from the BW image sensor (for example, the first image sensor 430).

In another example, if images are captured in a low-illumination environment, different capturing conditions may be set for the color image sensor (for example, the second image sensor 440) and the BW image sensor (for example, the first image sensor 430), and thus the color image sensor (for example, the second image sensor 440) and the BW image sensor (for example, the first image sensor 430) may generate a BW image and at least one color image for an object based on the different capturing conditions.

The processor 450 may include various processing circuitry and/or program elements that provides a scheme of solving the problem of not achieving a high frame rate due to a limited amount of received light, and a scheme of solving the problem of a required large amount of computation for the scheme.

The processor 450 may set an independent capturing condition for each of the first and second sensors 430 and 440, and perform image matching including color synthesis and image synthesis based on image frames received from the first and second sensors 430 and 440.

The sensor driver 454 of the processor 450 may control driving of each of the first and second sensors 430 and 440. That is, the sensor driver 454 may turn on or off both of the first and second sensors 430 and 440 or turn on only one of the first and second sensors 430 and 440. To set an independent capturing condition (a first or second setting value) for each of the first and second sensors 430 and 440, an exposure value, a shutter speed, a sensor sensitivity (ISO characteristic value), an iris value, or the like may be set for each of the first and second sensors 430 and 440.

For example, the sensor driver 454 may set different camera setting values (capturing conditions such as exposure) for the first and second sensors 430 and 440 in a low-illumination environment. The image processor 452 may acquire images having different characteristics based on the different camera setting values, and synthesize the acquired images, thereby acquiring a bright, clear image even in the low-illumination environment. In this case, the image processor 452 may use the wide dynamic range (DR) of a BW image, and the DR and color reproduction characteristics of a color image during the image synthesis.

In an ultra-low-illumination environment, the sensor driver 454 may turn off the second sensor 440 being a color image sensor, and turn on the first sensor 430 being a BW image sensor. In this case, the image processor 452 may generate a new image by synthesizing BW images captured by the first sensor 430. The first sensor 430 may capture the BW images based on different settings. For this purpose, the sensor driver 454 may set a plurality of capturing conditions for each sensor.

The image processor 454 of the processor 450 may include various processing circuitry and/or program elements that perform frame rate conversion (FRC) on first image frames received from the first sensor 430 and second image frames received from the second sensor 440. For example, the FRC may be performed by a duplicated frame-based scheme or a motion compensation-based scheme.

For example, the image processor 452 may acquire a BW image frame (source BW image frame) having a relatively high data rate from the first sensor 430, and at least one color image frame having a relatively low data rate from the second sensor 440. The image processor 452 may perform image matching using the BW image frame and the at least one color image frame. The image matching may include color synthesis, image synthesis, and so on.

For example, the color synthesis may be performed by color diffusion into the BW image frame having the high resolution, based on color information acquired from the color image frames having the low resolution. The color diffusion may be performed by diffusing the acquired color information into the BW image frame.

For example, the image synthesis may be performed by applying luminance information acquired from the BW image frame having the high resolution to the color image frames having the low resolution.

A color image frame with a converted data rate, that is, an increased resolution may be achieved as an output image by the color synthesis or the image synthesis.

According to the above description, a computation volume may be reduced by detecting a global motion in a color image frame having a low resolution, and local dense matching may be performed on a part having the global motion. The local dense matching may also be another factor that reduces the computation volume. As the local dense matching defines an area with no motion variation between successive image frames, the local dense matching may be used to reduce the amount of compressed data.

According to an embodiment, the first sensor 430 may be configured as a BW image sensor, and the second sensor 440 may be configured as a color image sensor. The BW image sensor is characterized by providing a larger amount of received light than the color image sensor by about three times. For example, for a high resolution (high definition (HD)), the BW image sensor may process 480 fps, while the color image sensor may process 240 fps. Although the BW image sensor is generally capable of processing up to 720 fps, it may be possible to control fps according to an AP codec performance, the number of ADCs, and an MIPI bandwidth.

In this case, the first sensor 430 may output BW image frames at a high frame rate, relative to the second sensor 450. The second sensor 440 may output color image frames at a low frame rate, relative to the first sensor 430.

In an example, the BW image sensor corresponding to the first sensor 430 may output a first BW image of an object at a first time, and a second BW image of the object at a second time. The first sensor 430 may output more other BW images, in addition to the first and second BW images. The first sensor 430 may output more BW images at every first time interval.

The color image sensor corresponding to the second sensor 440 may output a color image of the object. The second sensor 440 may output a plurality of color images during a time period between the first time and the second time.

The resolution of the first BW image may be high relative to that of the plurality of color images.

The processor 450 may acquire the first BW image and the plurality of color images from the first time until before the second time. The processor 450 may acquire color information or part of the color information from the acquired color images or each of the color images. The processor 450 may generate a color image by synthesizing the first BW image with the acquired color information.

Figure 5:
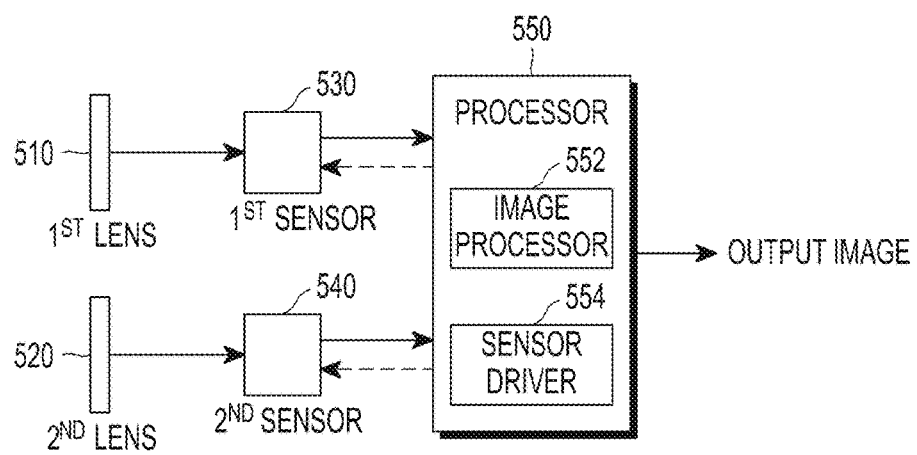
FIG. 5 is a diagram illustrating another example configuration of the image processing apparatus according to various example embodiments.

FIG. 5 is a diagram illustrating another example configuration of the image processing apparatus according to various example embodiments.

The image processing apparatus illustrated in FIG. 5 is configured so as to have an independent lens for each sensor, instead of the distributor 420 of the image processing apparatus illustrated in FIG. 4.

According to an embodiment, a first lens 510 and a second lens 520 may be configured independently in correspondence with a first sensor 530 and a second sensor 540, respectively. The first lens 510 and the second lens 520 may differ in shape and size, and may be classified into various types according to their functions. For example, each of the first lens 510 and the second lens 520 may classified as a wide-angle lens, a normal lens, a telephoto lens, or a zoom lens according to its focal distance. Each of the first lens 510 and the second lens 520 may also be classified according to its property such as brightness or speed. For example, the brightness or speed of each of the lenses may be a property related to a minimum iris value f. The brightness of each of the lenses 510 and 520 refers to a minimum iris value f (maximum iris opening value).

As the maximum iris opening values of the first and second lenses 510 and 520 increase (the minimum iris values f decrease), the first and second lenses 510 and 520 may allow passing of more light per unit time (the lenses may be brighter). As the first and second lenses 510 and 520 get brighter, faster shutter speeds may be obtained, which makes it possible to acquire a brighter image even in a dark capturing environment (an environment in which a small amount of light is received).

According to various example embodiments, the first lens 510 and the second lens 520 may have the same or different characteristics. For example, the first lens 510 may be a wide-angle lens, and the second lens 520 may be a telephoto lens. Depending on their types, the first lens 510 and the second lens 520 may differ in the degree of refracting light reflected from an object, the amount of light, and so on.

The other components, that is, the first and second sensors 530 and 540, and a processor 550 including an image processor 552 and a sensor driver 554 may be identical to their respective counterparts illustrated in FIG. 4 in terms of functionality and operation.

While not shown, the numbers of lenses and the numbers of sensors in FIGS. 4 and 5 are not limited for the various example embodiments. That is, the various example embodiments are not applied restrictively to a specific number of lenses or a specific number of sensors. Further, the configuration illustrated in FIG. 4 may be combined with the configuration illustrated in FIG. 5. That is, an image processing apparatus may be configured in such a manner that light is provided to a plurality of sensors by one of three or more lenses and a distributor, and the other two or more lenses provide light to their corresponding sensors.

Figure 6:
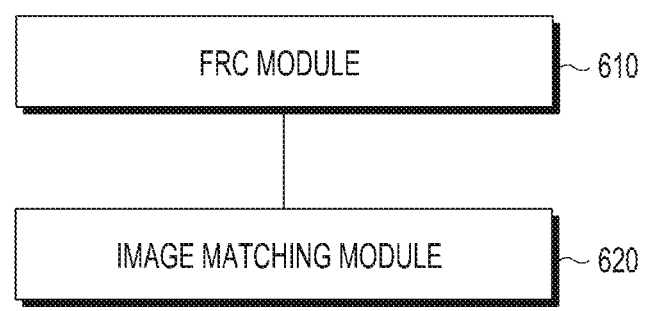
FIG. 6 is a block diagram illustrating an example module for image processing according to various example embodiments.

FIG. 6 is a block diagram illustrating an example image processing module according to various example embodiments.

Referring to FIG. 6, each of the image processors 452 and 552 may include an FRC module (e.g., including FRC circuitry and/or program elements) 610 and an image matching module (e.g., including image matching circuitry and/or program elements) 620.

The FRC module 610 may acquire duplicated image frames (or extended image frames) using BW image frames (source BW image frames) having a relatively high data rate or a relatively high resolution.

The image matching module 620 may perform image matching using color image frames having a relatively low data rate or a relatively low resolution, and then perform image matching on the source BW image frames and/or the extended image frames. The image matching may include, for example, color synthesis involving color diffusion by which colors are added to the source BW image frames and/or the extended image frames using color information acquired from the color image frames. Further, the image matching may include, for example, image synthesis by which the resolution of the color image frames is increased using luminance information acquired from the source BW image frames and/or the extended image frames.

Each of the image processors 452 and 552 may acquire color image frames having a data rate or resolution converted by the image matching, as an output image.

According to an embodiment, the FRC module 610 may perform FRC by which the duplicated image frames (or the extended image frames) are acquired using the BW image frames (the source BW image frames). The FRC module 610 may perform FRC by a duplicated frame-based scheme or a motion compensation-based scheme.

For example, the FRC module 610 may perform FRC based on edged block scaling (EBS). EBS is a technique of processing images in a 3-layer hierarchical structure including an edged layer, a block layer, and a scaling layer. For example, the edged layer may transmit, to the scaling layer, edge information including mode information and block size information, which may be acquired by compressing edges. The block layer may acquire additional information such as the brightness, texture, complexity, and so on of an image in a block unit, and output the additional information. The scaling layer may down-scale an input image based on the edge information including the mode information and the block size information, received from the edged layer, and output the resulting scaling information. The additional information may include the edge information acquired by the edged layer and the scaling information acquired by the scaling layer.

According to an embodiment, EBS may enable extraction of a more accurate motion vector by detecting a global motion in a color image, extracting edges of a BW image, and performing FRC on the extracted edges.

The image matching module 620 may acquire a motion vector from a color image frame having a relatively low resolution, and detect a global motion using the acquired motion vector. The image matching module 620 may also search for a simple real motion based on the global motion from a BW image frame.

According to the above description, as a global motion is detected from a color image frame having a low resolution, a computation volume may be reduced, and local dense matching may be performed on a part having the global motion. This may also reduce the computation volume.

Figure 7:
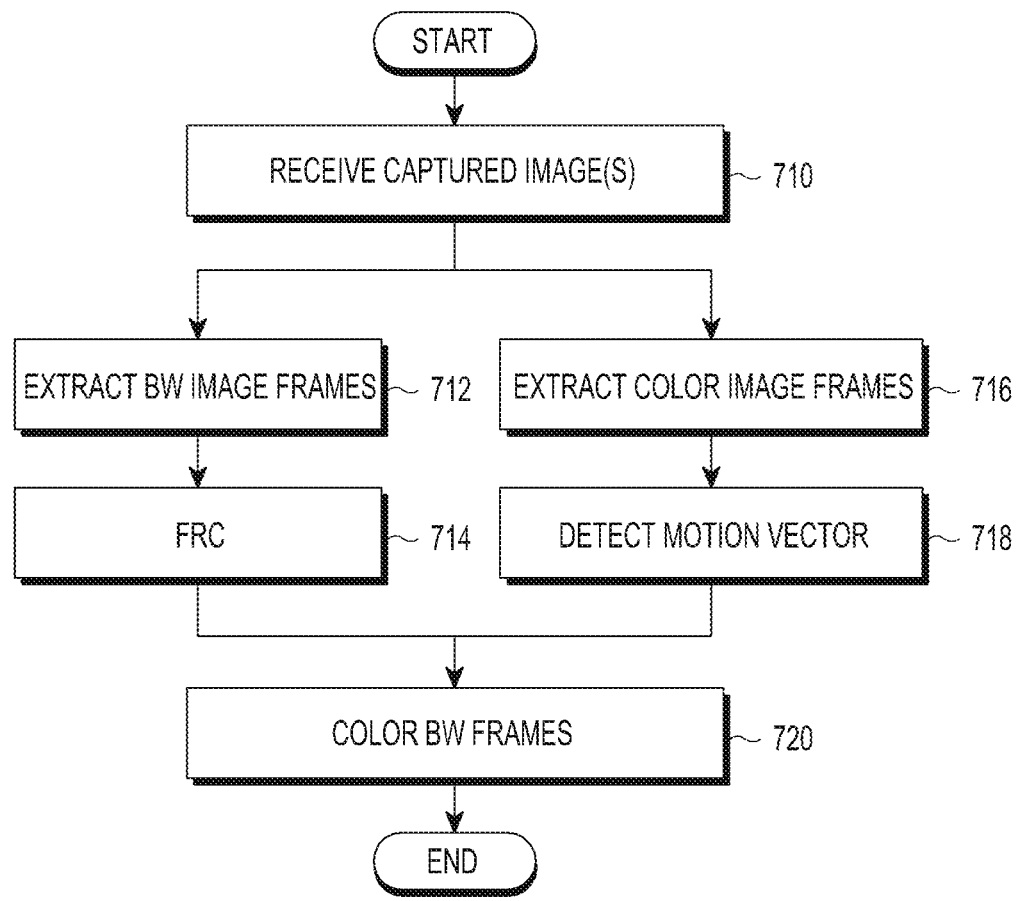
FIG. 7 is a flowchart illustrating an example control operation for an image processing procedure according to various example embodiments.

FIG. 7 is a flowchart illustrating an example control operation for an image processing procedure according to various example embodiments.

Referring to FIG. 7, an image processing apparatus (for example, the first sensor 430 or 530, or the second sensor 440 or 540) may receive a captured image in operation 710. The captured image may refer, for example, to detection of light refracted by one or more lenses in a plurality of sensors. Each of the sensors may output the detected light as an electrical image signal (image frames).

In operation 712, the image processing apparatus may extract a BW image frame using one of the plurality of sensors. The image processing apparatus may perform FRC using the extracted BW image frame in operation 714.

According to an embodiment, a duplicated image frame (or an extended image frame) may be acquired from a BW image frame (a source BW image frame) having a relatively high data rate. That is, FRC may be performed using the BW image frame (source BW image frame) to thereby acquire the duplicated image frame (extended image frame). The FRC may be performed by a duplicated frame-based scheme or a motion compensation-based scheme.

For example, FRC may be performed based on EBS. EBS may enable extraction of a more accurate motion vector by detecting a global motion in a color image, extracting edges of a BW image, and performing FRC on the extracted edges.

The image processing apparatus may extract color image frames having a relatively low resolution using one of the plurality of sensors in operation 716, and detect a motion vector using the extracted color image frames in operation 718.

For example, the image processing apparatus may perform image matching using the color image frames having the relatively low data rate, and then perform color diffusion on the BW image frame.

According to an embodiment, a motion vector may be acquired from the color image frames having the low resolution. A global motion vector may be detected using the acquired motion vector. Herein, a simple real motion may be detected based on the global motion vector from the BW image frame having the high resolution.

The image processing apparatus may color the FRC-processed BW image frame or the acquired BW image frame based on the detected motion vector in operation 720. As a consequence, the image processing apparatus may acquire color image frames with a changed resolution, as an output image.

Figure 8:
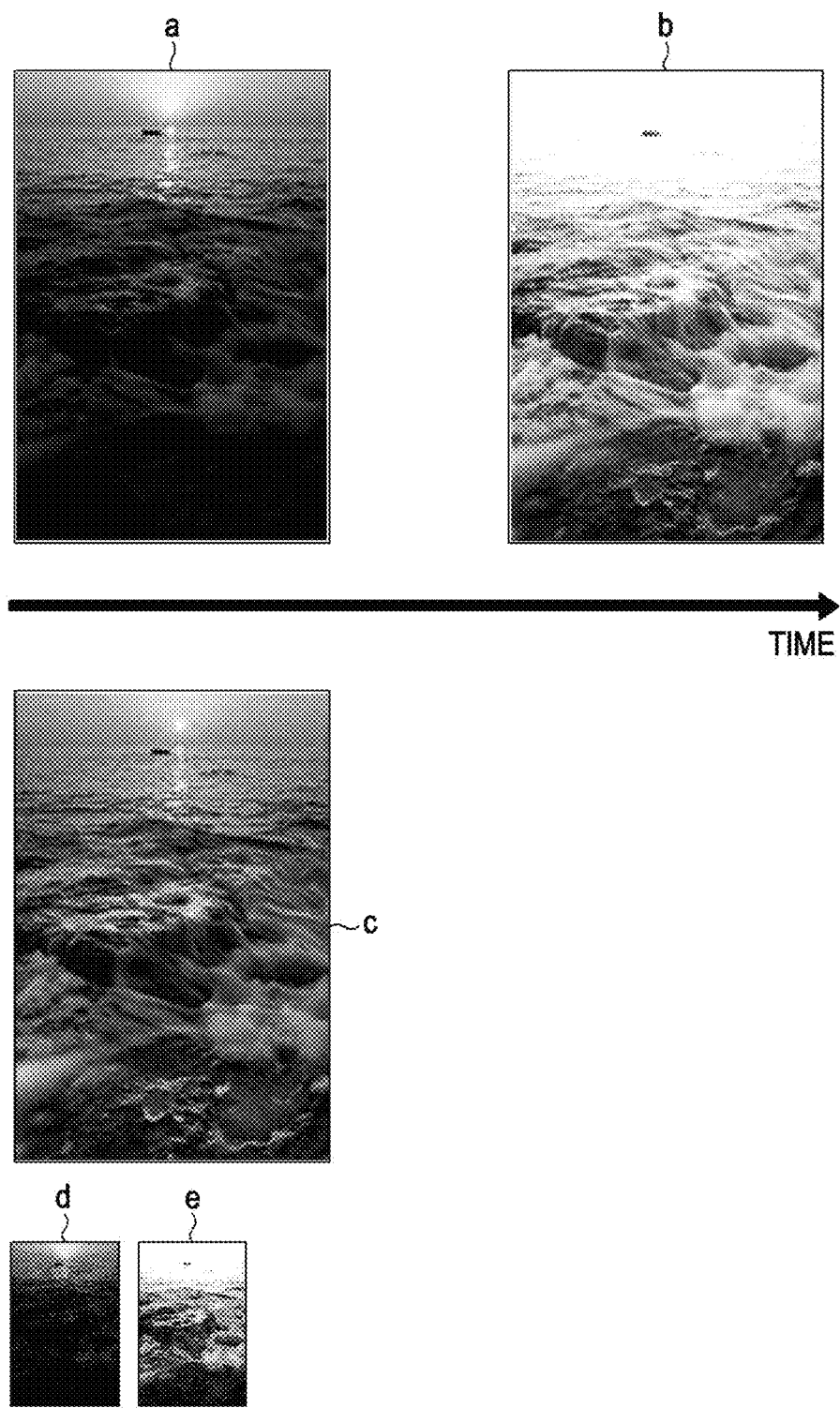
FIG. 8 is a diagram illustrating example images captured by two image sensors in an electronic device according to various example embodiments.

FIG. 8 is a diagram illustrating example images captured by two image sensors in an electronic device according to various example embodiments.

Referring to FIG. 8, two upper color images a and b are captured under different exposure conditions by a color image sensor, and one lower BW image c is captured by a BW image sensor. The reason for being able to capture the two color images a and b in correspondence with the single BW image c during the same time period is that the BW image and the color images differ in resolution. That is, the BW image may have a high resolution relative to the color images. In this case, the read time of the high-resolution BW image may be long relative to the read time of the low-resolution color image. Therefore, it is possible to capture the two color images a and b during the read time of the single BW image c. For reference, to indicate that the two color images have a low resolution, they are shown as small images d and e under the single high-resolution BW image c.

It may be noted from the two color images that a longer exposure time has been set for capturing the second color image b than for capturing the first color image a.

Figure 9:
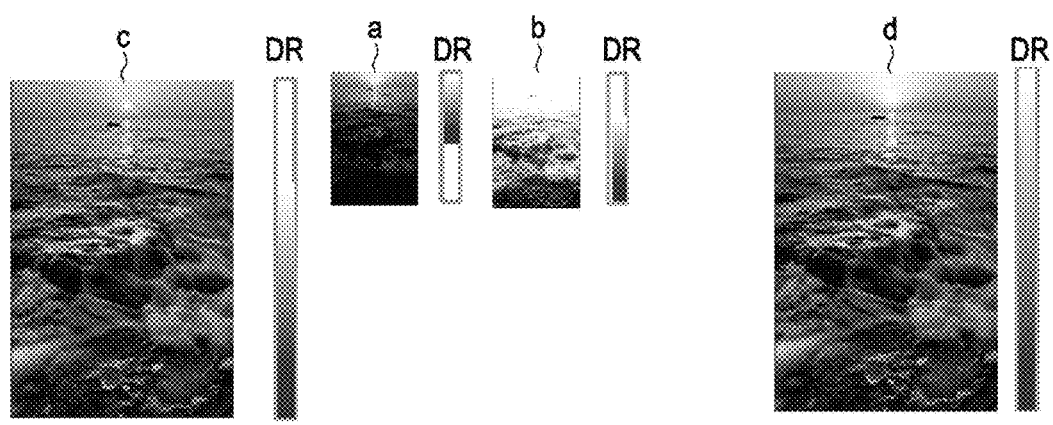
FIG. 9 is a diagram illustrating example image synthesis in an electronic device according to various example embodiments.

FIG. 9 is a diagram illustrating example image synthesis in an electronic device according to various example embodiments.

Referring to FIG. 9, one composite image d may be generated by synthesizing the single BW image c with the two color images a and b. It may be noted that the DR of the single BW image c is wide, relative to the DRs of the two color images a and b. It may also be noted that the DR of the color image b is wider than that of the color image a.

For example, luminance information may be acquired from the single BW image c, chrominance information may be acquired from the two color images a and b, and then the single composite image d may be acquired using the acquired luminance information and chrominance information.

Figure 10:
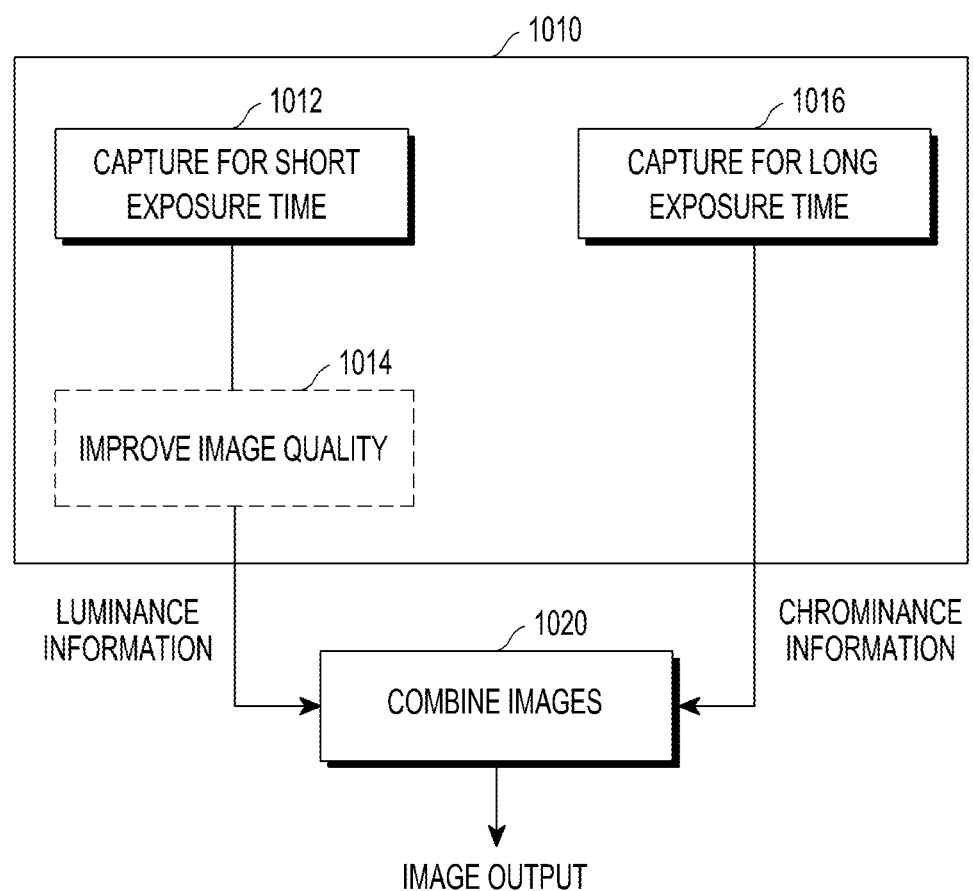
FIG. 10 is a diagram illustrating an example image synthesis procedure in an electronic device according to various example embodiments.

FIG. 10 is a diagram illustrating an example image synthesis procedure in an electronic device according to various example embodiments.

Referring to FIG. 10, an image synthesis procedure for a low-illuminance situation may include information extraction in operation 1010 and image combining in operation 1020.

In the information extraction operation 1010, luminance information may be extracted from a BW image captured during a short exposure time in operation 1012, and chrominance information may be extracted from a plurality of color images captured during a long exposure time in operation 1016. For this purpose, short exposure time-related settings (exposure, shutter speed, and so on) may be made for an image sensor that will capture a BW image, and long exposure time-related settings (exposure, shutter speed, and so on) may be made for an image sensor that will capture a plurality of color images. The BW image and the plurality of color images may have to be captured during an almost same time period.

If the illuminance is very low, a plurality of images may be captured and a brightness increasing procedure may be performed using the captured images in operation 1014. This operation may be applied to capturing of color images as well as to capturing of a BW image. If the illuminance is low, a capturing condition may be set for the color image sensor so that exposure may be long for the color image sensor. Besides, a plurality of capturing conditions may be set for the color image sensor so that a color image may be captured based on each capturing condition. In this case, a color image with improved quality may be acquired using a plurality of color images acquired under different capturing conditions.

However, if the color image sensor requires long exposure, the color image sensor may be deactivated in an ultra-low-illumination environment. In this case, a plurality of BW images may be captured under different conditions only by means of the BW image sensor, and a BW image with improved quality may be generated based on the BW images.

Figure 11:
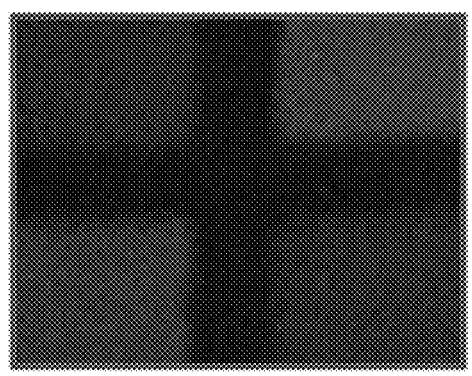
FIG. 11 is a diagram illustrating an example image processing result according to various example embodiments.
Figure 11:
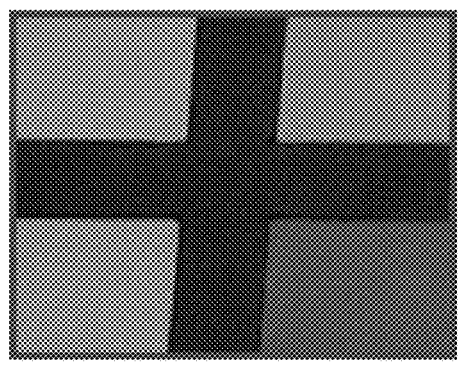
Figure 11:
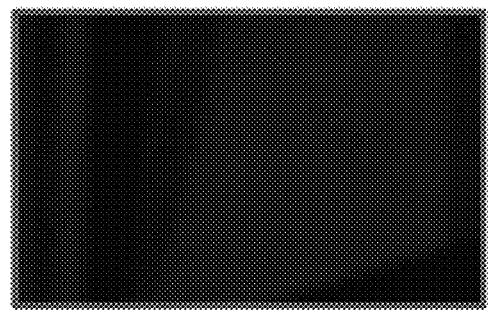
Figure 11:
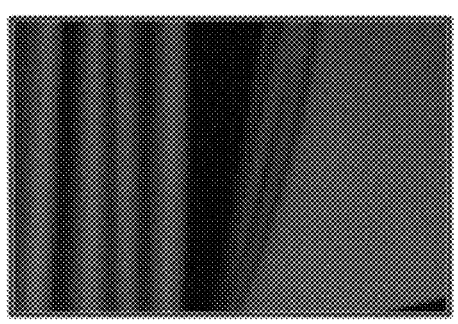

FIG. 11 is a diagram illustrating an example image processing result according to various example embodiments.

Referring to FIG. 11, two left images are an example of a color image and a BW image acquired respectively by a color image sensor and a BW image sensor in a low-illumination environment, and two right images are an example of images resulting from processing the color image and the BW image according to an example embodiment. It may be noted that the images prior to the image processing become bright and clear after the image processing.

Figure 12:
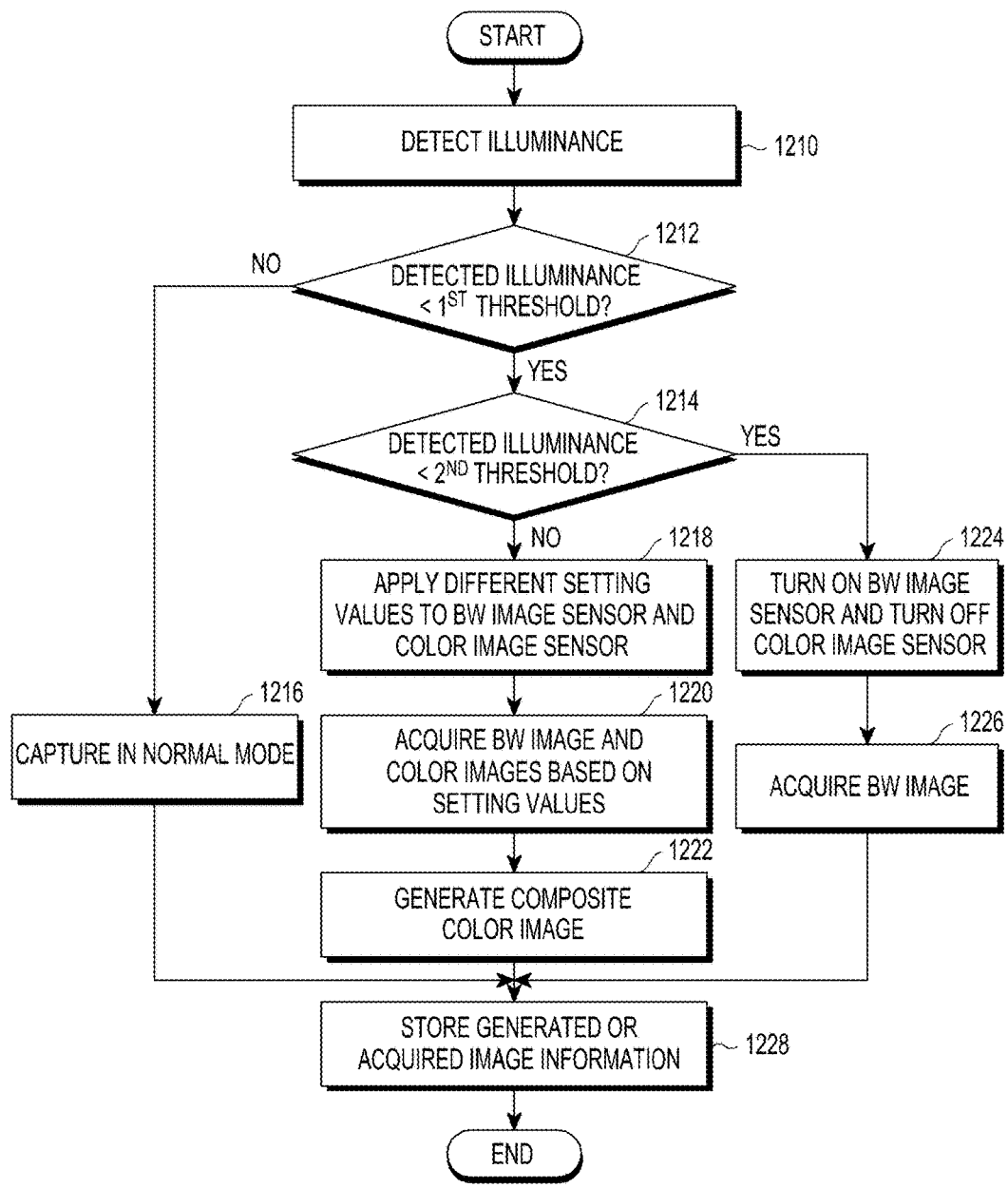
FIG. 12 is a flowchart illustrating an example control operation for image processing in an electronic device according to various example embodiments.

FIG. 12 is a flowchart illustrating an example control operation for image processing in an electronic device according to various example embodiments.

Referring to FIG. 12, the electronic device (for example, the processor 120) may measure an illuminance at any time point, and acquire the measured illuminance value in operation 1210. For example, the electronic device may measure an ambient illuminance at a time point when an object is to be captured by use of at least one of a BW image sensor and a color image sensor.

The electronic device determines whether the acquired illuminance value is lower than a first threshold in operation 1212. The first threshold may be predetermined based on an illuminance value with which to determine a situation that provides an illuminance with no influence on capturing. On the other hand, the first threshold may be preset to a reference illuminance value with which to determine a low-illuminance situation. In this case, the first threshold may be set to 50 lux.

If the acquired illuminance value is equal to or larger than the predetermined first threshold, the electronic device may capture an object in a normal mode in operation 1216.

If the acquired illuminance value is smaller than the predetermined first threshold, the electronic device additionally determines whether the acquired illuminance value is smaller than a predetermined second threshold in operation 1214. The second threshold may be preset to a reference illuminance value with which to determine an ultra-low-illuminance situation. In this case, the second threshold may be set to 10 lux.

If the acquired illuminance value is equal to or larger than the predetermined second threshold, the electronic device may apply different setting values to the BW image sensor and the color image sensor, determining that the current capturing environment has a low illuminance in operation 1218. That is, the electronic device may set a first setting value for the BW image sensor and a second setting value for the color image sensor to be different. The first setting value may be a value that determines exposure of the BW image sensor, and the second setting value may be a value that determines exposure of the color image sensor. For example, the first and second setting values may be values that determine at least one of a shutter speed, an ISO value, and an automatic white balance (AWB)/automatic exposure (AE) value.

The electronic device may acquire a BW image of the object based on the first setting value by means of the BW image sensor, and at least one color image of the object based on the second setting value by means of the color image sensor in operation 1220. Preferably, the electronic device may include a plurality of setting values in information that defines the second setting value, and acquire a color image based on each of the setting values by means of the color image sensor. In this case, the electronic device may acquire a plurality of color images having low resolutions according to various settings by means of the color image sensor during a time period over which the electronic device acquires one BW image having a high resolution by means of the BW image sensor.

The electronic device performs image synthesis on the acquired BW image and the at least one color image, thereby generating a color image having a high resolution in operation 1222. For example, the electronic device may acquire color information or part of the color information from the color images having the low resolution, and generate a color image having a high resolution by performing image matching on the BW image having the high resolution using the acquired color information or the part of the color information.

According to the above description, the electronic device may acquire low-resolution color images based on various setting values that determine exposure during a read time over which one BW image is acquired. Therefore, the electronic device may acquire a desired color image just by processing low-resolution multiple frames (color image frames), not high-resolution multiple frames, and processing one high-resolution frame.

If the acquired illuminance value is smaller than the predetermined second threshold, the electronic device may turn on (activate) the BW image sensor and turn off (deactivate) the color image sensor, determining that the capturing environment is an ultra-low-illuminance situation in operation 1224. In this case, the electronic device will acquire only a BW image from the BW image sensor in operation 1226.

The electronic device may store as video data in a memory, one of the BW or color image captured in the normal mode, the high-resolution color image generated in the low-illuminance environment, and the BW image acquired in the ultra-low-illuminance environment in operation 1228. The electronic device may display, on a screen, one of the BW or color image captured in the normal mode, the high-resolution color image generated in the low-illuminance environment, and the BW image acquired in the ultra-low-illuminance environment.

As is apparent from the foregoing description, the apparatus and method for processing an image according to various example embodiments of the present disclosure may overcome problems related to the amount of received light and a computation volume, which obstruct acquisition of an image having a high frame rate.

While the disclosure has been illustrated and described with reference to certain example embodiments thereof, it will be understood by those skilled in the art that various changes in form and details may be made therein without departing from the spirit and scope of the disclosure as defined by the appended claims and their equivalents.

What is claimed is:

1. An electronic device comprising:
a memory;
a first black-and-white image sensor;
a second image sensor which is disposed next to the first black-and-white image sensor; and
a processor,
wherein the processor is configured to set different values as a first setting value for the first black-and-white image sensor and a second setting value for the second image sensor if an illuminance value indicating an illuminance at an arbitrary time point does not satisfy a predetermined illuminance value, to acquire a black-and-white image of an object based on the first setting value using the first black-and-white image sensor, to acquire at least one color image of the object based on the second setting value using the second image sensor, the first setting value and the second setting value allowing acquisition of at least two color images using the second image sensor, during acquisition of one black-and-white image using the first black-and-white image sensor, to generate a color image by synthesizing the black-and-white image with a color determined based on at least part of color information of the at least one color image, and to store the generated color image as video data in the memory, and
wherein the black-and-white image has a resolution greater than a resolution of the at least one color image.

2. The electronic device of claim 1, wherein the processor is configured to set the arbitrary time point as a time to capture the object using at least one of the first black-and-white image sensor and the second image sensor.

3. The electronic device of claim 1, wherein the processor is configured to set the first setting value as a value determining exposure of the first black-and-white image sensor, and to set the second setting value as a value determining exposure of the second image sensor.

4. The electronic device of claim 3, wherein the processor is configured to set the first setting value and the second setting value as values determining at least one of: a shutter speed, an international standard organization (ISO) value, and an automatic white balance (AWB)/automatic exposure (AE) value.

5. The electronic device of claim 1, wherein the processor is configured to activate the first black-and-white image sensor, while deactivating the second image sensor, to acquire only a black-and-white image using the first black-and-white image sensor if the illuminance value indicating the illuminance at the arbitrary time point does not satisfy a second threshold lower than a first threshold corresponding to the predetermined illuminance value.

6. The electronic device of claim 5, wherein the processor is configured to set the first threshold to 50 lux and the second threshold to 10 lux.

7. The electronic device of claim 1, wherein the processor is configured to set a plurality of different second setting values for the second image sensor, and to acquire at least two color images based on the plurality of different second setting values using the second image sensor.

8. The electronic device of claim 1, wherein the processor is configured to generate the color image from the black-and-white image using at least partial information of a first color image of one of the two color images and at least partial information of a second color image of the other of the two color images.

9. The electronic device of claim 8, wherein the processor is configured to set different values as a second setting value for acquiring the first color image and a second setting value for acquiring the second color image.

10. A method of operating an electronic device including a first black-and-white image sensor, and a second image sensor which is disposed next to the first black-and-white image sensor, the method comprising:
setting different values as a first setting value for the first black-and-white image sensor and a second setting value for the second image sensor in response to an illuminance value indicating an illuminance at an arbitrary time point not satisfying a predetermined illuminance value;
acquiring a black-and-white image of an object based on the first setting value using the first black-and-white image sensor;
acquiring at least one color image of the object based on the second setting value using the second image sensor, the first setting value and the second setting value allowing acquisition of at least two color images using the second image sensor, during acquisition of one black-and-white image using the first black-and-white image sensor;
generating a color image by synthesizing the black-and-white image with a color determined based on at least part of color information of the at least one color image; and
storing the generated color image as video data in a memory,
wherein the black-and-white image has a resolution greater than a resolution of the at least one color image.

11. The method of claim 10, wherein the arbitrary time point is a time to capture the object using at least one of the first black-and-white image sensor and the second image sensor.

12. The method of claim 10, wherein the first setting value is a value determining exposure of the first black-and-white image sensor, and the second setting value is a value determining exposure of the second image sensor.

13. The method of claim 12, wherein the first setting value and the second setting value are values determining at least one of: a shutter speed, an international standard organization (ISO) value, and an automatic white balance (AWB)/automatic exposure (AE) value.

14. The method of claim 10, further comprising, activating the first black-and-white image sensor, while deactivating the second image sensor, to acquire only a black-and-white image using the first black-and-white image sensor in response to the illuminance value indicating the illuminance at the arbitrary time point not satisfying a second threshold lower than a first threshold corresponding to the predetermined illuminance value.

15. The method of claim 14, wherein the first threshold is 50 lux and the second threshold is 10 lux.

16. The method of claim 10, wherein the generation of a color image comprises generating the color image from the black-and-white image using at least partial information of a first color image being one of the two color images and at least partial information of a second color image being the other of the two color images.

17. The method of claim 16, wherein a second setting value for acquiring the first color image is set to be different from a second setting value for acquiring the second color image.

18. A computer-readable non-transitory recording medium storing a program for controlling an electronic device including a first black-and-white image sensor, and a second image sensor which is disposed next to the first black-and-white image sensor, the program, when executed by a processor, causing the electronic device to perform at least one operation comprising:
    setting different values as a first setting value for the first black-and-white image sensor and a second setting value for the second image sensor in response to an illuminance value indicating an illuminance at an arbitrary time point not satisfying a predetermined illuminance value;
    acquiring a black-and-white image of an object based on the first setting value using the first black-and-white image sensor;
    acquiring at least one color image of the object based on the second setting value using the second image sensor, the first setting value and the second setting value allowing acquisition of at least two color images using the second image sensor, during acquisition of one black-and-white image using the first black-and-white image sensor;
    generating a color image by synthesizing the black-and-white image with a color determined based on at least part of color information of the at least one color image; and
    storing the generated color image as video data in a memory,
        wherein the black-and-white image has a resolution greater than a resolution of the at least one color image.

* * * * *